US010257336B2

(12) United States Patent
Asai

(10) Patent No.: US 10,257,336 B2
(45) Date of Patent: *Apr. 9, 2019

(54) NON-TRANSITORY COMPUTER-READABLE MEDIUM AND PORTABLE DEVICE

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,782

(22) Filed: Apr. 12, 2018

(65) Prior Publication Data

US 2018/0234536 A1    Aug. 16, 2018

Related U.S. Application Data

(63) Continuation of application No. 15/632,589, filed on Jun. 26, 2017, now Pat. No. 9,948,761.

(30) Foreign Application Priority Data

Jun. 27, 2016  (JP) ................................ 2016-126923

(51) Int. Cl.
*H04B 1/38* (2015.01)
*H04M 1/725* (2006.01)
(Continued)

(52) U.S. Cl.
CPC ......... *H04M 1/72527* (2013.01); *B41J 3/445* (2013.01); *G06F 3/1204* (2013.01);
(Continued)

(58) Field of Classification Search
CPC ........... H04N 1/00095; H04N 1/00307; H04N 1/00408; H04N 1/00424; H04N 1/00474;
(Continued)

(56) References Cited

U.S. PATENT DOCUMENTS 6,453,132 B2   9/2002  Ishikura
8,259,136 B2   9/2012  Kim
(Continued)

FOREIGN PATENT DOCUMENTS

JP   2001-229157 A   8/2001
JP   2009-031916 A1  2/2009

OTHER PUBLICATIONS

Notice of Allowance dated Dec. 8, 2018 from parent U.S. Appl. No. 15/632,589.

*Primary Examiner* — Quochien B Vuong
(74) *Attorney, Agent, or Firm* — Scully, Scott, Murphy & Presser, PC

(57) ABSTRACT

A non-transitory computer-readable medium having a computer program readable by a computer of a portable device connectable to an image input device and image output device and including a memory storing external programs activated by the computer program, the computer program causes the portable device to perform: receiving a user operation on a first screen including first objects corresponding to the external programs; determining the designated program when the first object is designated; when the designated program has a first function of executing processing for the input data, instructing the image input device to execute an input operation and performing first post-processing; and when the designated program has the second function of enabling a user to designate the output data, performing pre-processing and controlling the image output device to execute output operation for the output data.

20 Claims, 14 Drawing Sheets

(51) Int. Cl.
  *B41J 3/44* (2006.01)
  *G06F 3/12* (2006.01)
  *G06F 9/445* (2018.01)
  *G06F 9/451* (2018.01)

(52) U.S. Cl.
  CPC .......... *G06F 3/1224* (2013.01); *G06F 3/1292* (2013.01); *G06F 9/445* (2013.01); *G06F 9/451* (2018.02)

(58) Field of Classification Search
  CPC ......... H04N 2201/0094; H04B 1/3833; H04M 1/21; H04M 1/72527; H04M 2201/38; H04M 2201/42
  USPC .............................. 455/90.1, 556.1, 557, 566
  See application file for complete search history.

(56) References Cited

U.S. PATENT DOCUMENTS

2007/0206225 A1  9/2007  Shinohara
2009/0031252 A1  1/2009  Toda
2017/0262296 A1  9/2017  Sohn

FIG. 3A

| PROGRAM ID | PROGRAM NAME | FUNCTION INFORMATION | INITIAL ACTIVATION FLAG | AFTER-INPUT ACTIVATION FLAG |
|---|---|---|---|---|
| 001 | LABEL PRINTING | INPUT, OUTPUT | OFF | ON |
| 002 | OCR | INPUT | ON | OFF |
| 003 | MAP | OUTPUT | OFF | — |

FIG. 3B

| PROGRAM ID | IMAGE DATA |
|---|---|
| 002 | DATA A |
| 002 | DATA B |
| 003 | DATA C |
| ... | ... | ly aspects of the disclosure provide a portable
NON-TRANSITORY COMPUTER-READABLE MEDIUM AND PORTABLE DEVICE

CROSS-REFERENCE TO RELATED APPLICATION

This application is a continuation application of U.S. Ser. No. 15/632,589 filed on Apr. 17, 2018 and claims priority from Japanese Patent Application No. 2016-126923 filed on Jun. 27, 2016, the entire subject-matter of each of which are incorporated herein by reference.

TECHNICAL FIELD

The disclosure relates to a program of a portable device configured to generate image data by using an external program installed in the portable device.

BACKGROUND

There has been disclosed an information processing apparatus configured to display an icon corresponding to a newly added function on a display and to execute the function as the icon is tapped. The related-art information processing apparatus is configured to enable a user to designate a screen and a position at which each icon is to be displayed.

As for program for the portable device, there has been proposed a portable device program having a function of processing image data by using an external program installed in the portable device. The external program that the program can use includes a program that is to be activated before processing the image data and a program that is to be activated after processing the image data. That is, when displaying icons, which correspond to the respective external programs of which activation timings are different, on a user's desired screen, the external programs may not be activated at appropriate timings.

SUMMARY

Illustrative aspects of the disclosure provide a portable device program capable of activating an external program at an appropriate timing during processing of image data.

The specification discloses a variety of aspects. According to one aspect, there may be provided a non-transitory computer-readable medium having a computer program stored thereon and readable by a computer of a portable device, the portable device comprising a memory, a display and an input interface and being connectable to an image input device configured to execute an input operation of transmitting input data, which is input in accordance with an instruction of the computer program, to the portable device and to an image output device configured to execute an output operation of transmitting output data designated by the computer program, the memory storing a plurality of external programs that can be activated by the computer program, the computer program, when executed by the computer, causes the portable device to perform: obtaining function information, the function information indicating a function of each of the external programs; displaying a first screen on the display, the first screen comprising a plurality of first objects each of which corresponds to each of the plurality of external programs; receiving a user operation on the first screen through the input interface; in response to the first object being designated in the receiving of the user operation on the first screen, determining whether a designated program, which is the external program corresponding to the designated first object, has one of a first function and a second function, based on the function information of the designated program, the first function being a function of executing processing for the input data, the second function being a function of enabling a user to designate the output data; in response to it being determined that the designated program has the first function, instructing the image input device to execute the input operation; and performing first post-processing of designating the input data input in the input operation and activating the designated program; and in response to it being determined that the designated program has the second function, performing pre-processing of activating the designated program to obtain the output data; and controlling the image output device to execute the output operation for the output data obtained in the pre-processing.

According to the above configuration, it is possible to activate the external program corresponding to the designated first object at the appropriate timing in accordance with the function information after the input instruction processing and before the output instruction processing. Thereby, it is possible to smoothly execute a series of processing for the image data.

BRIEF DESCRIPTION OF DRAWINGS

FIGS. 3A and 3B are examples of data stored in a memory 62, in which FIG. 3A depicts a program list and FIG. 3B depicts image data associated with program IDs.

FIGS. 8A and 8B depict display examples of a display 53, in which FIG. 8A depicts a menu screen and FIG. 8B depicts a main screen.

FIGS. 9A and 9B depict display examples of the display 53, in which FIG. 9A depicts a device selection screen and FIG. 9B depicts an obtaining source selection screen.

FIGS. 10A and 10B depict display examples of the display 53, in which FIG. 10A depicts a preview screen and FIG. 10B depicts a label editing screen.

FIGS. 11A and 11B depict display examples of the display 53, in which FIG. 11A depicts a map designation screen and FIG. 11B depicts a scan setting screen.

FIGS. 12A and 12B depict display examples of the display 53, in which FIG. 12A depicts a scan result screen and FIG. 12B depicts an EULA screen.

FIGS. 13A and 13B depict display examples of the display 53, in which FIG. 13A depicts a data selection screen and FIG. 13B depicts an OCR screen.

FIGS. 14A and 14B depict display examples of the display 53, in which FIG. 14A depicts an input source selection screen and FIG. 14B depicts the scan setting screen in which a pull-down menu 181 is set to be non-changeable.

DETAILED DESCRIPTION

Hereinafter, an illustrative embodiment of the disclosure will be described with reference to the drawings. Meanwhile, the illustrative embodiment to be described later is just an example of the disclosure, and the illustrative embodiment of the disclosure can be appropriately changed without changing the gist of the disclosure. For example, an execution sequence of each processing to be described later can be appropriately changed without changing the gist of the disclosure.

Figure 1:
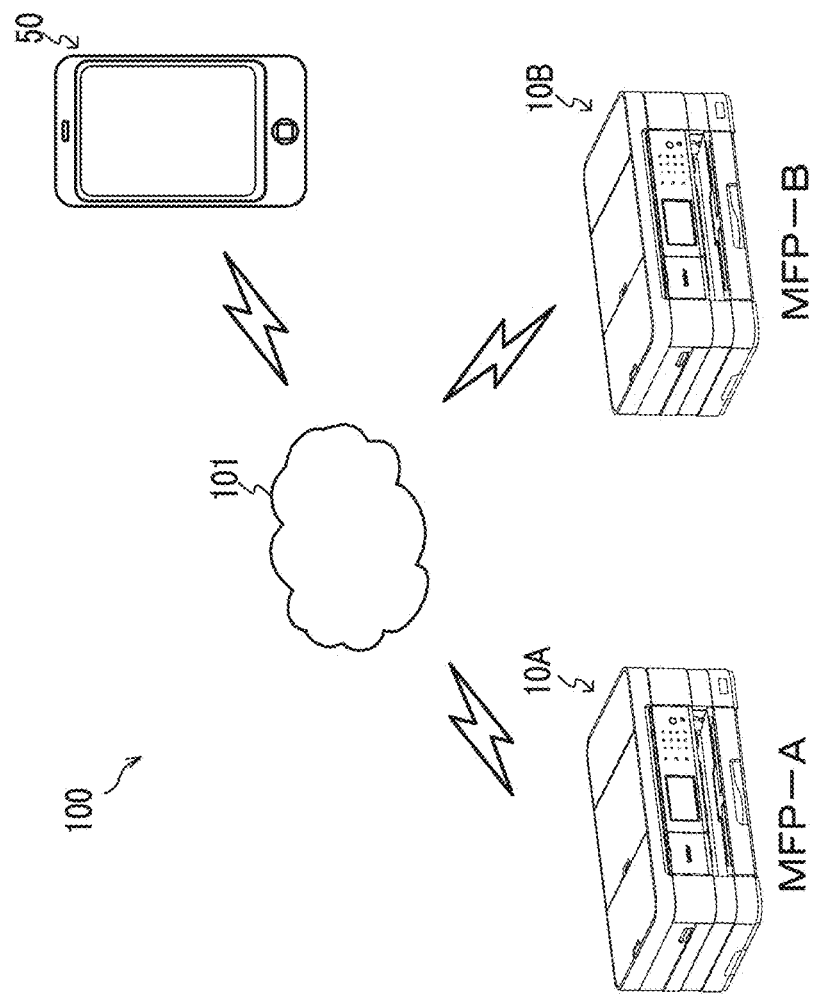
FIG. 1 is a schematic view of a system 100 in accordance with an illustrative embodiment.

FIG. 1 is a schematic view of a system 100 in accordance with an illustrative embodiment. The system 100 shown in FIG. 1 includes MFPs 10A, 10B (hereinafter, also collectively referred to as "MFP 10") and a portable device 50. The MFP 10 and the portable device 50 is configured to perform communication with each other via a communication network 101. The communication network 101 may be a wired LAN, a wireless LAN 102 or a combination thereof, for example.

Figure 2A:
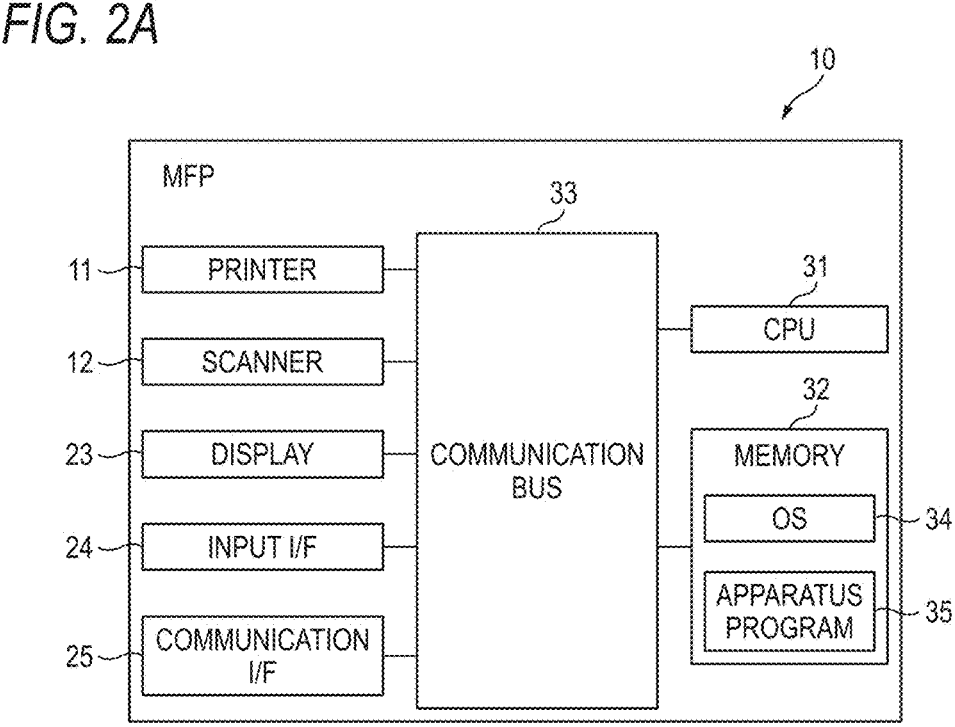
FIG. 2A is a block diagram of an MFP 10.

As shown in FIG. 2A, the MFP 10 (abbreviation of MultiFunction Peripheral) mainly has a printer 11, a scanner 12, a display 23, an input I/F 24, a communication I/F 25, a CPU 31, a memory 32 and a communication bus 33. The respective constitutional elements configuring the MFP 10 are connected to each other through the communication bus 33.

The printer 11 is configured to execute a print operation of recording an image expressed by image data onto a sheet. As a recording method of the printer 11, a well-known method such as an inkjet method and an electrophotographic method can be adopted. The scanner 12 is configured to execute a scan operation of reading an image recorded on a document and generating image data (hereinafter, referred to as "scan data"). Incidentally, the operations that can be executed by the MFPs 10A, 10B may be the same or not.

The printer 11 is an example of the image output device, and the print operation is an example of the output operation. However, the specific example of the image output device is not limited to the printer 11 and may be any hardware capable of executing the output operation of outputting the output data. As the image output device, a FAX device configured to execute a FAX transmission operation of FAX-transmitting image data in accordance with a FAX protocol, or the like can also be exemplified.

The scanner 12 is an example of the image input device, and the scan operation is an example of the input operation. However, the specific example of the image input device is not limited to the scanner 12 and may be any hardware capable of executing the input operation of transmitting input data, which is to be input in accordance with an instruction of a terminal program 65 (which will be described later), to the portable device 50. In other words, the image input device may be hardware configured to input the input data to the terminal program of the portable device 50. As the image input device, a camera capable of executing a photographing operation of imaging a photographic subject to generate photographic data and the like can also be exemplified. Also, a receptacle which a portable storage medium such as a USB memory is to be detachably mounted thereto, and which is configured to read out image data from the mounted portable storage medium, or the like can be exemplified as the image input device.

Also, the portable device 50 may be connected to the printer 11, the scanner 12 or the receptacle (not shown) of the MFP 10 via the communication network 101 or may be connected to a camera (not shown) via the communication bus 63, which is an example of the internal bus. Both the input data and the output data are image data.

The scanner 12 is configured to execute the scan operation in accordance with an execution condition. The execution condition is specified by a combination of a plurality of parameters each of which corresponds to each of a plurality of items (for example, "size", "image quality", "reading color"). The parameter of the item "size" indicates a size (for example, "A4", "B5", "name card") of a document on which an image of a reading target is recorded. The parameter of the item "image quality" indicates a reading resolution (for example, "normal", "fine") of the scan operation. The parameter of the item "reading color" indicates a color (for example, "color", "monochrome") of an image that is to be read in the scan operation. In the meantime, although the printer 11 is configured to execute the print operation in accordance with an execution condition, the description thereof is herein omitted.

The display 23 is a liquid crystal monitor, an organic EL display or the like and has a display surface for displaying a variety of information.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on the display surface of the display 23. An operation of designating an object displayed on the display surface of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 is configured to output position information indicative of a position on the display surface touched by the user. The input I/F 24 may be implemented as a touch sensor. In the specification, the "touch" includes all operations of bringing an input medium into contact with the display surface. Although the input medium is not in contact with the display surface, "hover" or "floating touch" of bringing the input medium close to a position at which a distance between the input medium and the display surface is very small may be included in the concept of the "touch." The input medium may be a user's finger, a touch pen or the like. A user operation of tapping a position of an icon displayed on the display 23 is an example of the user operation of designating the icon.

The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark of the Wi-Fi Alliance) can be adopted, for example. Also, when the MFP 10 and the portable device 50 are connected to each other by a USB cable or the like, the communication I/F 25 may be a USB interface to which the USB cable is to be detachably mounted.

The CPU 31 is configured to control overall operations of the MFP 10. The CPU 31 is configured to obtain and execute a variety of programs (which will be described later) from the memory 32, based on a variety of information output from the input I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable device 50, which will be described later.

Figure 2B:
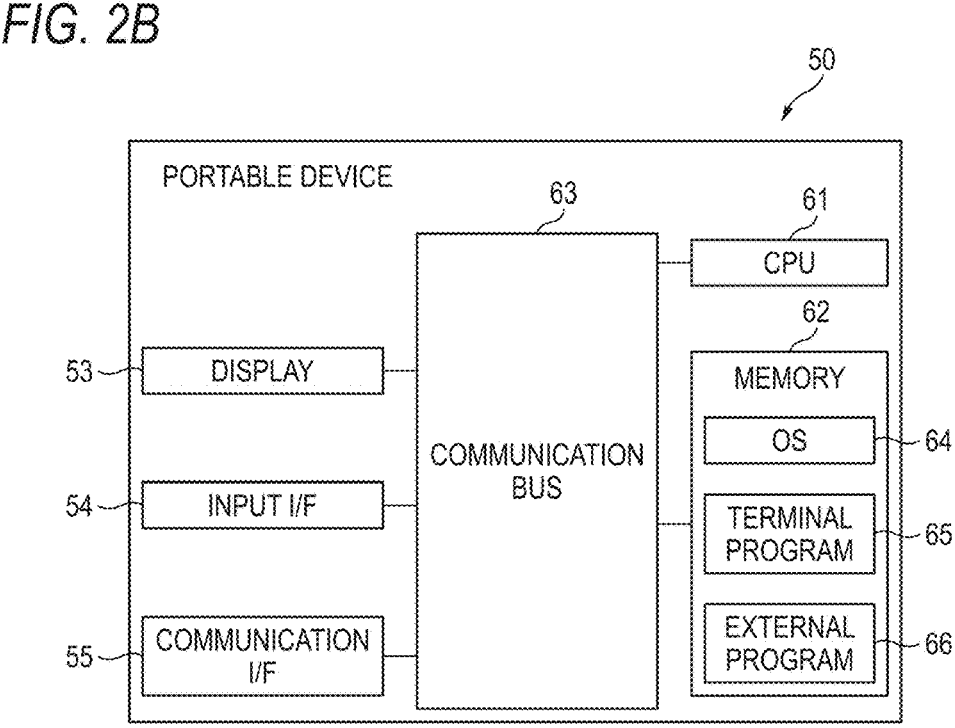
FIG. 2B is a block diagram of a portable device 50.
Figure 4B:
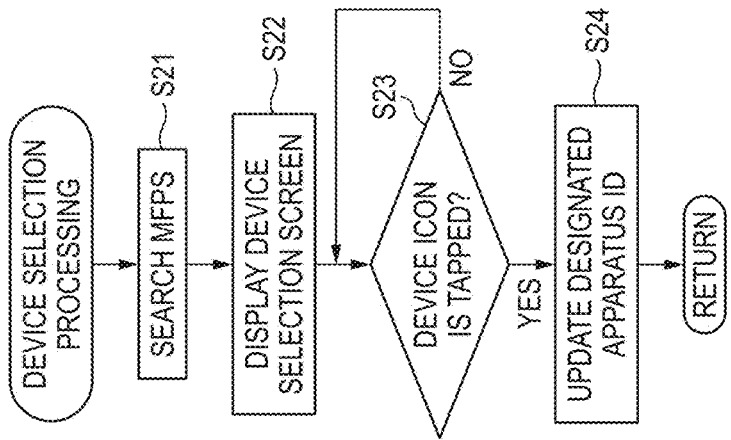
FIG. 4B is a flowchart of device selection processing.
Figure 4A:
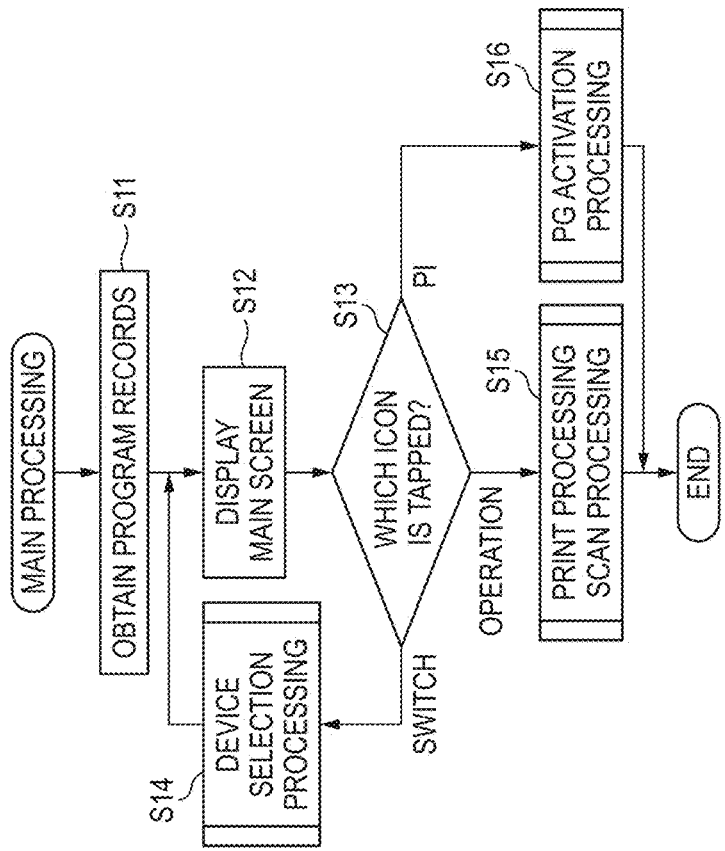
FIG. 4A is a flowchart of main processing.

As shown in FIG. 2B, the portable device 50 mainly has a display 53, n input I/F 54, a communication I/F 55, a CPU 61, a memory 62 and a communication bus 63. Since the display 53, the input I/F 54, the communication I/F 55, the CPU 61, the memory 62 and the communication bus 63 included in the portable device 50 have the same configurations as the display 23, the input I/F 24, the communication I/F 25, the CPU 31, the memory 32 and the communication bus 33 included in the MFP 10, the descriptions thereof are omitted. The CPU 61 and the memory 62 configure an example of the controller.

The portable device 50 may be a portable phone, a smart phone, a tablet terminal, a PC or the like, for example. More specifically, the display 53 of the portable device 50 preferably has a display screen size of 12 inch or less, and more preferably 8 inch or less. Also, the input I/F 54 of the portable device 50 is preferably a touch sensor superimposed on the display surface of the display 53. The memory 62 is configured to store therein an OS 64, a terminal program 65 and an external program 66.

The OS 64 may be Android (registered trademark of Google inc.) OS, iOS (registered trademark of Cisco Systems, Inc.), Windows Phone (registered trademark of Microsoft Corporation) Operating System or the like, for example. The OS 64 can execute a plurality of programs installed in the portable device 50 in parallel. The plurality of programs is virtually executed in parallel by a time-division multiplex method, for example. Also, the OS 64 is configured to execute one of the plurality of programs, which are to be executed in parallel, at the foreground and to execute the other programs at the background.

The foreground is a state where a screen associated with execution of the program is displayed in most of a display region of the display 53, for example. The background is a state where a screen associated with execution of a program different from the program is not displayed in most of the display region of the display 53, for example. That is, the portable device 50 can display on the display 53 only a screen associated with execution of a program, which is being executed at the foreground, of the plurality of programs being executed in parallel.

The terminal program 65 is an example of the main program configured to enable the MFP 10 connected via the communication I/F 55 to execute the print operation or the scan operation. The terminal program 65 is configured to transmit print instruction information for executing the print operation and scan instruction information for executing the scan operation to the MFP 10 via the communication I/F/ 55, for example. Also, the terminal program 65 can activate the external program 66 installed in the portable device 50 in a so-called plug-in manner.

The external program 66 is installed in or uninstalled from the portable device 50, in accordance with a user instruction input through the input I/F 54, for example. The external program 66 that can be activated by the terminal program 65 has a function for assisting processing of the terminal program 65, for example. Incidentally, the external program 66 is a program that is separate from the terminal program 65 and can be independently executed, and is different from a subroutine of the terminal program 65.

The external program 66 is activated by an API (hereinafter, "activation API") that is provided by the OS 64, for example. The terminal program 65 is configured to designate, as an argument, a program ID of the external program 66, for example, and to execute the activation API. As the activation API is executed, the OS 64 activates the external program 66 identified with the designated program ID. The external program 66 is configured to execute a predetermined operation, for example, and to provide an execution result of the operation to the terminal program 65, as a return value of the activation API.

As shown in FIG. 3, for example, the memory 62 can store therein a program list. The program list includes one or more program records. The program record is stored in the memory 62 upon the install of the terminal program 65, for example. The program record corresponds to one of the plurality of external programs 66 that can be activated by the terminal program 65. The program record includes a program ID, a program name, function information and an activation parameter.

The program ID is an example of the program identification information for identifying the external program 66. Hereinafter, the external program 66 identified with the program ID "xxx" may also be referred to as "external program 'xxx'". The program name is a name of the external program 66. The function information is information indicating a function of the corresponding external program 66. The initial activation flag is information indicating whether the corresponding external program 66 has been already activated. In other words, the initial activation flag is information indicating whether an EULA (abbreviation of End-User License Agreements) screen of the corresponding external program 66 has been already displayed. The after-input activation flag is an example of timing information indicating the activation timing of the corresponding external program 66.

More specifically, one or both of a value "input" indicating a first function of executing processing for input data obtained from the image input device and a value "output" indicating a second function of enabling a user to select output data, which is to be output to the image output device, are set in the function information. In the initial activation flag, a first value "ON" indicating that the corresponding external program 66 has been already activated or a second value "OFF" indicating that the corresponding external program 66 has not been activated yet is set. In the after-input activation flag, a first value "ON" indicating that the corresponding external program 66 is to be activated after processing of S43 (which will be described later) or a second value "OFF" indicating that the corresponding external program 66 is to be activated without executing the processing of S43 is set.

The initial values of the initial activation flag and the after-input activation flag are the second value "OFF". The setting values of the initial activation flag and the after-input activation flag can be changed by the terminal program 65 or the external program 66, for example. Also, the after-input activation flag is included only in the program record including the function information "input".

The external program "001" indicated by the program name "label printing" has a first function of generating an image to be recorded to a CD-ROM from an image expressed by the input data, in accordance with a user operation through the input I/F 54. Also, the external program "001" has a second function of providing the terminal program 65 with image data indicating an image generated in accordance with a user operation through the input I/F 54, as the output data. The external program "002" indicated by the program name "OCR" has a first function of extracting a character string included in the input data, as text data. The external program "003" indicated by the program name "map" has a second function of providing the terminal program 65 with map image data, which is to be extracted in accordance with a user operation through the input I/F 54, of map image data obtained from a server (not shown), as the output data.

Also, as shown in FIG. 3B, the memory 62 can store therein program IDs and image data associated with the program IDs, for example. The image data shown in FIG. 3B is not stored upon install of the terminal program 65 or the external program 66 identified with the corresponding program ID, for example, and is stored in the memory 62 by the terminal program 65 or the external program 66. The image data shown in FIG. 3B is data becoming the input data or the output data.

Also, although not shown, the memory 62 is provided therein with a photograph data folder in which photograph data is to be stored. Also, although not shown, the memory 62 can store therein designated apparatus IDs. The designated apparatus ID is an apparatus ID for identifying the MFP 10 (hereinafter, referred to as "designated apparatus"), which is designated through the terminal program 65 by the user, of the MFPs 10A, 10B capable of performing communication with the portable device 50 via the communication network 101. In the illustrative embodiment, the MFP 10A is identified with an apparatus ID "MFP-A", and the MFP 10B is identified with an apparatus ID "MFP-B".

[Operations of System 100]

Operations of the system 100 in accordance with the illustrative embodiment are described with reference to FIGS. 4 to 7.

A flowchart of the specification basically indicates processing that is to be executed by the CPUs 31, 61 in accordance with commands described in the program. That is, in the below descriptions, the processing of "determination", "extraction", "selection", "calculation", "determining", "specifying", "control" and the like indicates the processing of the CPUs 31, 61. The processing that is to be executed by the CPUs 31, 61 includes hardware controls through the OS 34, 64, too. Also, in the specification, "data" is expressed by a bit string that can be read by a computer. The data having substantially the same meaning and the different formats is handled as the same data. This also applies to the "information" of the specification.

Figure 8B:
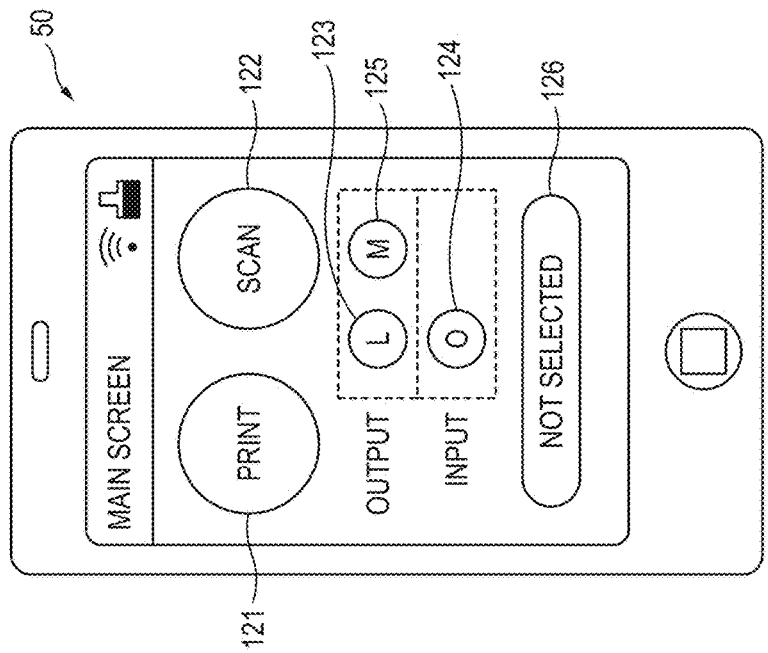
Figure 8A:
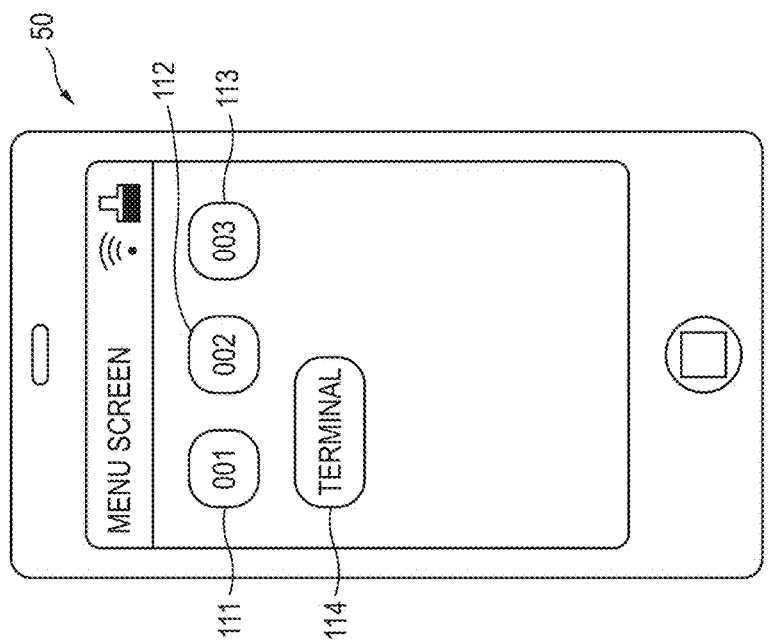

First, the OS 64 of the portable device 50 displays a menu screen shown in FIG. 8A on the display 53. The menu screen includes a plurality of program icons 111, 112, 113, 114. The program icons 111 to 114 correspond to the programs installed in the portable device 50. For example, the program icons 111 to 113 correspond to the external programs 66 installed in the portable device 50, and the program icon 114 corresponds to the terminal program 65. The OS 64 receives a user operation of designating one of the program icons 111 to 114, through the input I/F 54.

As an example, when a designation on the program icon 111 is received through the input I/F 54, the OS 64 activates the external program "001" and executes the corresponding program at the foreground. As another example, when a designation on the program icon 114 is received through the input I/F 54, the OS 64 activates the terminal program 65 and executes the corresponding program at the foreground. Hereinafter, processing that is executed when the program icon 114 is designated is described.

When the terminal program 65 of the portable device 50 is activated by the OS 64, the terminal program 65 reads all the program records registered in the program list (S11). The processing of S11 is an example of the obtaining processing of obtaining the function information, the initial activation flag and the after-input activation flag. Then, the terminal program 65 displays a main screen shown in FIG. 8B on the display 53 (S12). Then, the terminal program 65 receives a user operation on the main screen through the input I/F 54 (S13). The processing of S12 is an example of the first display processing, and the processing of S13 is an example of the first reception processing.

The main screen is an example of the first screen including operation icons 121, 122, plug-in icons 123, 124, 125 and a switching icon 126. The operation icon 121 is an object for receiving an execution instruction of the print operation. The operation icon 122 is an object for receiving an execution instruction of the scan operation. The plug-in icons 123 to 125 are examples of the first object corresponding to the external programs "001", "002", "003". The switching icon 126 is an object for receiving a switching instruction of the designated apparatus.

Meanwhile, in the main screen, the plug-in icons 123, 125 corresponding to the external programs "001", "003" in which the function information "output" is set and the plug-in icon 124 corresponding to the external program "002" in which only the function information "input" is set are displayed in a different manner (e.g., different style, different appearance, distinctively displayed). Also, when the designated apparatus ID is not stored in the memory 62, a character string "not selected" indicating that a designated apparatus has not been selected is described in the switching icon 126. On the other hand, although not shown, when the designated apparatus ID is stored in the memory 62, the corresponding designated apparatus ID is described in the switching icon 126.

Subsequently, when a designation on the switching icon 126 is received through the input I/F 54 (S13: switching), for example, the terminal program 65 executes device selection processing (S14). The device selection processing is described in detail with reference to FIG. 4B.

[Device Selection Processing]

First, the terminal program 65 searches the plurality of MFPs 10 capable of performing communication via the communication I/F 55 by using an SNMP (abbreviation of Simple Network Management Protocol) (S21). Specifically, the terminal program 65 broadcasts transmission request information to the communication network 101 via the communication I/F 55. Then, the terminal program 65 receives the apparatus IDs, which are transmitted by the MFPs 10A, 10B as a response to the transmission request information, via the communication I/F 55. That is, the terminal program 65 specifies the MFPs 10A, 10B, which are transmission sources of the apparatus IDs, as the MFP 10 that can perform communication. In the meantime, as the method of searching the MFP 10 that can perform communication, the other well-known methods can also be adopted.

Figure 9A:
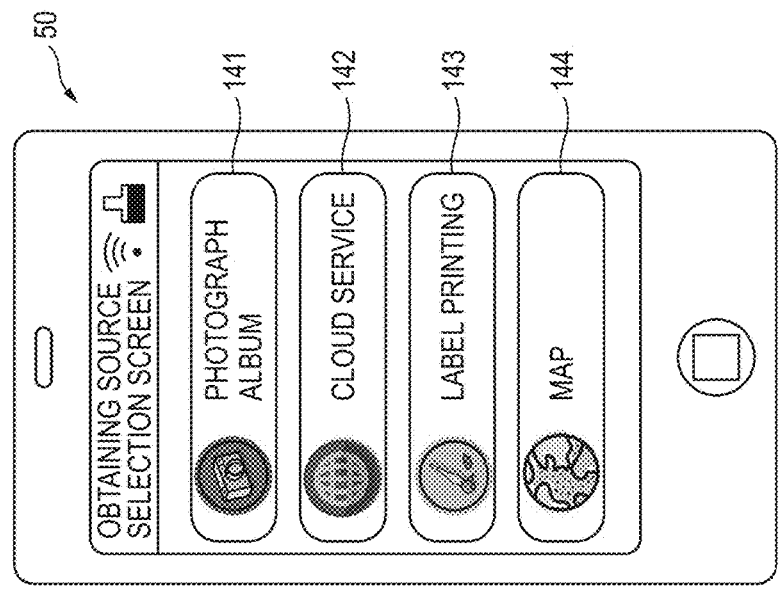

Then, the terminal program 65 displays a device selection screen shown in FIG. 9A on the display 53 (S22). The device selection screen includes device icons 131, 132. The device icons 131, 132 correspond to the MFPs 10A, 10B specified in S21. Also, the apparatus IDs of the corresponding MFPs 10A, 10B are described in the device icons 131, 132. Then, the terminal program 65 receives a user operation on the device selection screen through the input I/F 54 (S23).

Then, when a designation on the device icon 131 is received through the input I/F 54 (S23: Yes), for example, the terminal program 65 stores the apparatus ID received from the MFP 10A corresponding to the device icon 131 in the memory 62, as the designated apparatus ID (S24). When the designated apparatus ID has been already stored in the memory 62, the terminal program 65 overwrites the designated apparatus ID with the new designated apparatus ID.

Returning to FIG. 4A, the terminal program 65 displays the main screen on the display 53 (S12). In the main screen after the device icon 131 is designated, the designated apparatus ID "MFP-A" is described in the switching icon 126. Then, when a designation on the operation icon 121 is received through the input I/F 54 (S21: operation), the terminal program 65 executes print processing shown in FIG. 5 (S15).

[Print Processing]

Figure 9B:
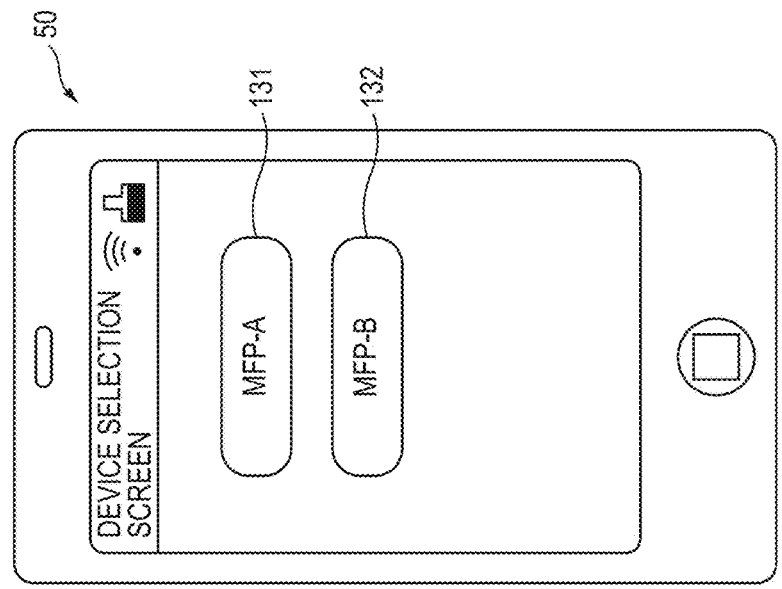

First, the terminal program 65 displays an obtaining source selection screen shown in FIG. 9B on the display 53 (S31). The obtaining source selection screen includes obtaining source icons 141, 142 and plug-in icons 143, 144. The obtaining source icon 141 corresponds to the photograph data folder of the memory 62, which is an obtaining source of the photograph data, and the obtaining source icon 142 corresponds to a server (not shown) on the Internet. Also, the plug-in icon 143 corresponds to the external program "001", and the plug-in icon 144 corresponds to the external program "003". Then, the terminal program 65 receives a user operation on the obtaining source selection screen through the input I/F 54 (S32).

When the terminal program 65 receives a designation on the obtaining source icon 141 through the input I/F 54 (S32: obtaining source), for example, the terminal program 65 displays a list of photograph data stored in the photograph data folder on the display 53 and receives a user operation of designating one of the list-displayed photograph data through the input I/F 54. Then, the terminal program 65 reads out the designated photograph data from the memory 62, as the output data (S34).

Also, when the terminal program 65 receives a designation on the obtaining source icon 142 through the input I/F 54 (S32: obtaining source), for example, the terminal program 65 displays a list of image data stored in the server (not shown) on the display 53 and receives a user operation of designating one of the list-displayed image data through the input I/F 54. Then, the terminal program 65 receives the designated image data from the server via the communication I/F 55, as the output data (S34).

Figure 10A:
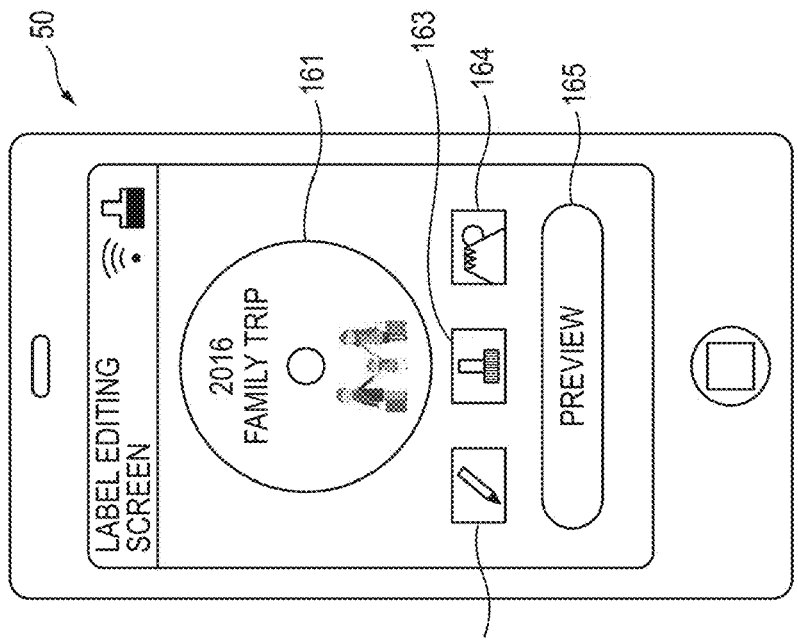

Then, the terminal program 65 displays a preview screen shown in FIG. 10A on the display 53 (S35). The preview screen includes a preview image 151 and a [print] icon 152. The preview image 151 indicates an image in which an image expressed by the obtained output data is recorded on a sheet. Then, the terminal program 65 receives a user operation on the preview screen through the input I/F 54 (S36).

Subsequently, when the terminal program 65 receives a designation on the [print] icon 152 through the input I/F 54 (S36: Yes), the terminal program 65 transmits print instruction information to the MFP 10A, which is the designated apparatus, via the communication I/F 55 (S37). The print instruction information is information for enabling the designated apparatus to execute the print operation. The print instruction information includes the output data, for example. The processing of S37 is an example of the output instruction processing.

In the meantime, although not shown, the apparatus program 35 of the MFP 10A receives the print instruction information from the portable device 50 via the communication I/F 25. Then, the apparatus program 35 enables the printer 11 to execute the print operation in accordance with the received print instruction information. That is, the printer 11 records an image, which is expressed by the output data included in the print instruction information, on a sheet.

Also, when the terminal program 65 receives a designation on the plug-in icon 143 through the input I/F 54 (S32: PI), for example, the terminal program 65 activates the external program "001" associated with the plug-in icon 143 (S33). That is, the terminal program 65 designates the program ID "001", as an argument, and executes the activation API. Also, the OS 64 activates the external program "001" identified with the program ID "001", which is an argument of the activation API, at the foreground. Also, the OS 64 switches the terminal program 65 from the foreground to the background.

Figure 10B:
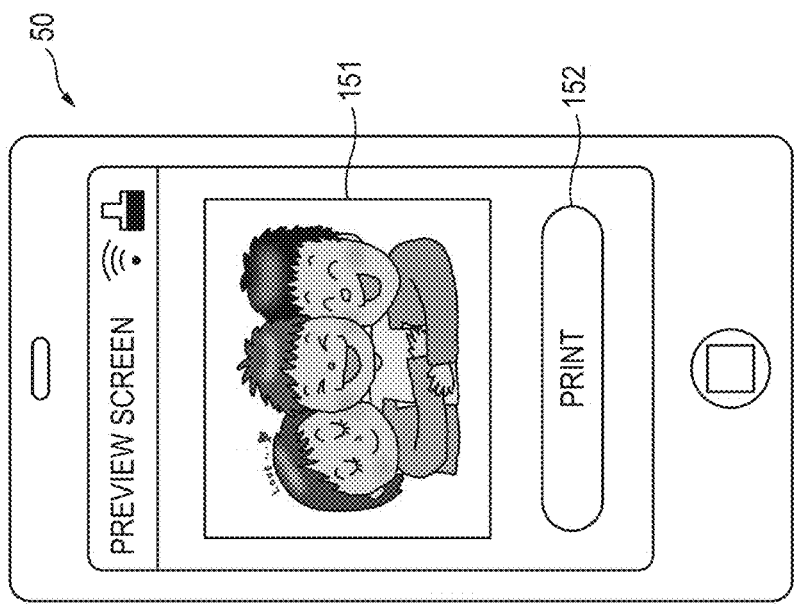

When the external program "001" is activated from the terminal program 65 by the activation API, the external program "001" displays a label editing screen shown in FIG. 10B on the display 53. The label editing screen includes a label image 161, editing icons 162, 163, 164 and a [preview] icon 165. The label image 161 is an image edited using the editing icons 162 to 164. The editing icon 162 corresponds to an instruction to add a character string to the label image 161. The editing icon 163 corresponds to an instruction to add a color to the label image 161. The editing icon 164 corresponds to an instruction to add a photograph to the label image 161. Then, the external program "001" receives a user operation on the label editing screen through the input I/F 54.

Subsequently, when the label image 161 is edited through the editing icons 162 to 164, the external program "001" temporarily stores label image data indicating the label image 161 after editing in the memory 62. Then, when the external program "001" receives a designation on the [preview] icon 165 through the input I/F 54, the external program "001" provides the terminal program 65 with a pointer indicating a head address of a memory region in which the label image data has been temporarily stored, as a return value of the activation API, and ends the processing. This processing is an example of the processing of enabling the user to designate the output data.

Also, when the terminal program 65 receives a designation on the plug-in icon 144 through the input I/F 54 (S32: PI), for example, the terminal program 65 activates the external program "003" associated with the plug-in icon 144 (S33). That is, the terminal program 65 designates the program ID "003", as an argument, and executes the activation API. Also, the OS 64 activates the external program "003" identified with the program ID "003", which is an argument of the activation API, at the foreground. Also, the OS 64 switches the terminal program 65 from the foreground to the background.

Figure 11B:
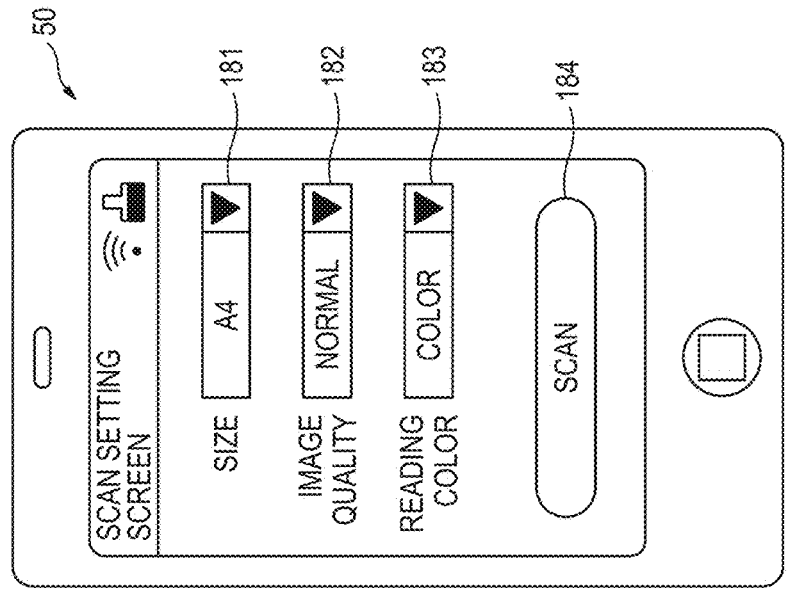
Figure 11A:
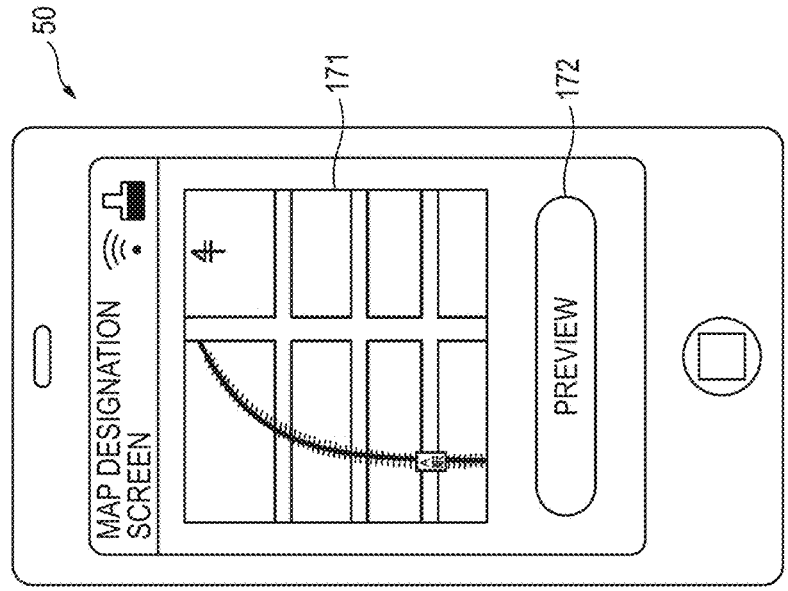

When the external program "003" is activated from the terminal program 65 by the activation API, the external program "003" displays a map designation screen shown in FIG. 11A on the display 53. The map designation screen includes a map image 171 and a [preview] icon 172. The external program "003" temporarily stores map image data received from the server (not shown) via the communication I/F 55 in the memory 62, and displays the map image 171 expressed by the map image data on the map designation screen. Then, the external program "003" receives a user operation on the map designation screen through the input I/F 54.

When the external program "003" receives a slide operation at a position of the map image 171 through the input I/F 54, for example, the external program "003" receives map image data, which indicates a region slid in accordance with a slide amount, from the server, temporarily stores the received map image data in the memory 62, and displays the map image 171 expressed by the map image data on the map designation screen. Then, when the external program "003" receives a designation on the [preview] icon 172 through the input I/F 54, the external program "003" provides the terminal program 65 with a pointer indicating a head address of a memory region in which the map image data has been temporarily stored, as a return value of the activation API, and ends the processing. This processing is an example of the processing of enabling the user to designate the output data.

Then, the terminal program 65 obtains the pointer as the return value of the activation API, and is switched from the background to the foreground by the OS 64. Then, the terminal program 65 reads out the label image data or the map image data stored in the memory region indicated by the obtained pointer from the memory 62, as the output data. The processing of S33 is an example of the pre-processing. Then, the terminal program 65 executes processing of S35 and thereafter by using the output data obtained from the external programs "001", "003".

Figure 6:
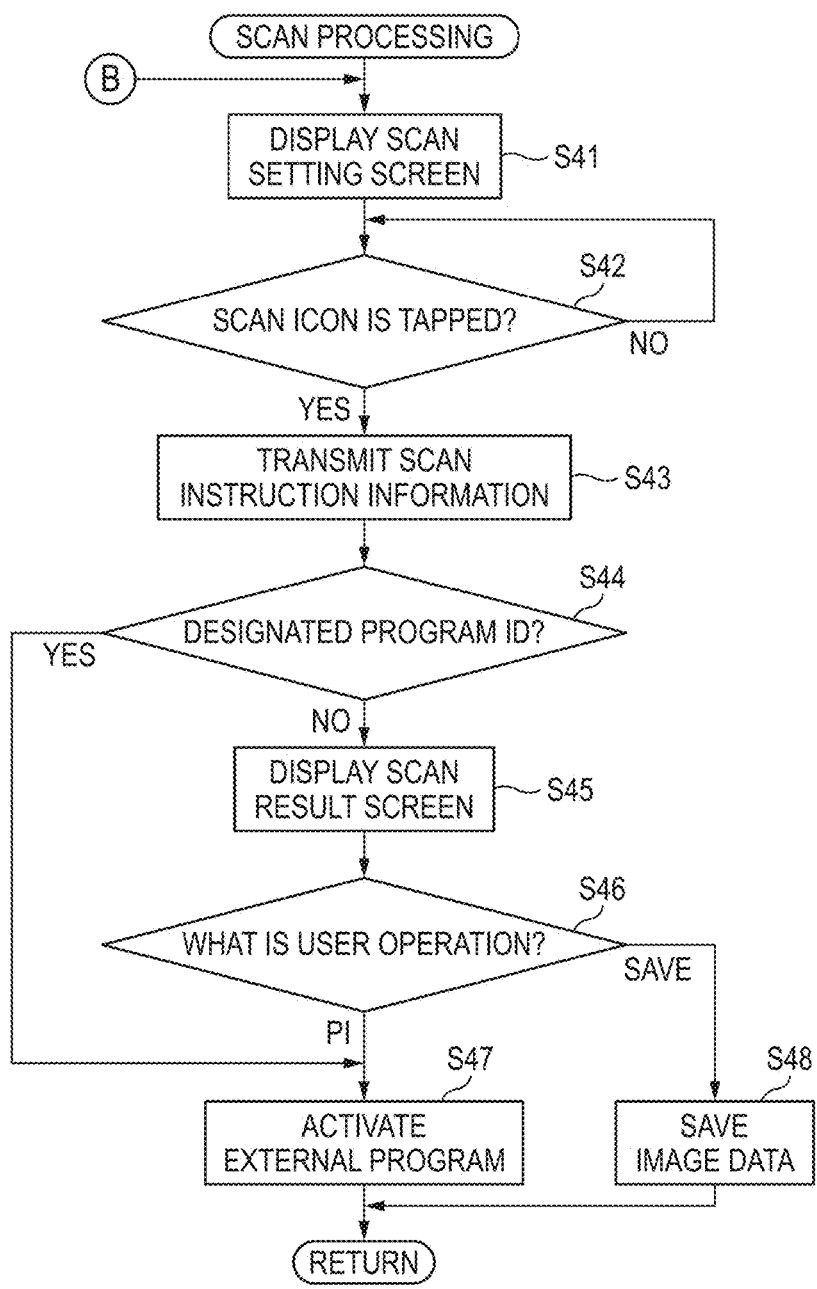
FIG. 6 is a flowchart of scan processing.
Figure 7:
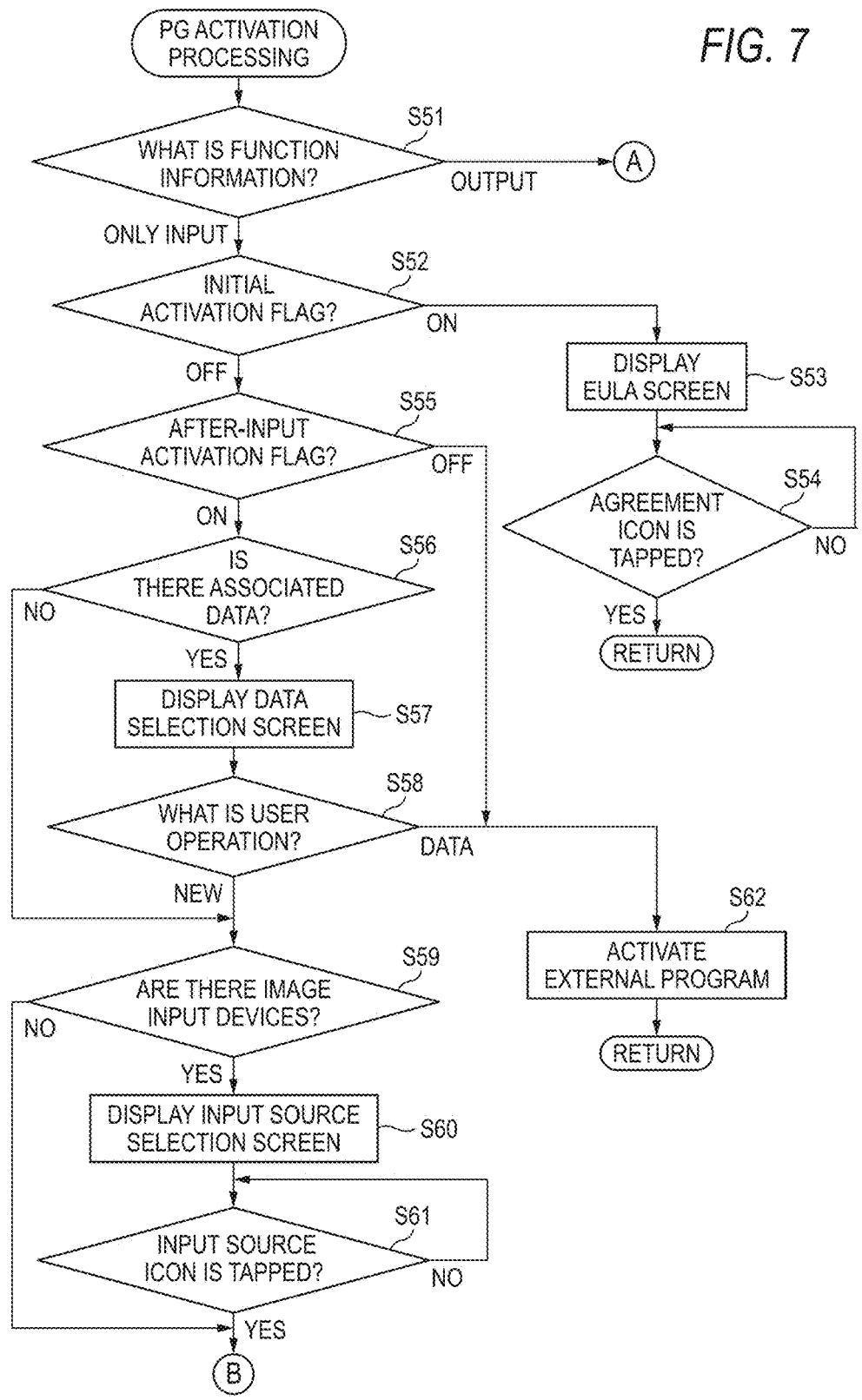
FIG. 7 is a flowchart of PG activation processing.

Returning to FIG. 4A, when the terminal program 65 receives a designation on the operation icon 122 shown in FIG. 8B through the input I/F 54 (S13: operation), the terminal program 65 executes scan processing shown in FIG. 6 (S15).

[Scan Processing]

First, the terminal program 65 displays a scan setting screen shown in FIG. 11B on the display 53 (S41). The scan setting screen is an example of the third screen including pull-down menus 181, 182, 183, and a [scan] icon 184. The pull-down menus 181 to 183 are examples of the third object corresponding to the items "size", "image quality" and "reading color" configuring the execution condition of the scan operation. Then, the terminal program 65 receives a user operation on the scan setting screen through the input I/F 54 (S42). The processing of S41 is an example the third display processing, and the processing of S42 is an example of the third reception processing.

In each of the pull-down menus 181 to 183, one of candidates for the plurality of parameters that can be designated with respect to the corresponding item is designated. The designated parameters are displayed in the pull-down menus 181 to 183. Also, the pull-down menus 181 to 183 have a plurality of options corresponding to the candidates for the parameters, respectively. The pull-down menu 181 corresponding to the item "size" has three options corresponding to candidates "A4", "B5" and "name card" for the condition parameter. Also, the pull-down menu 182 corresponding to the item "image quality" has two options corresponding to candidates "normal" and "fine" of the parameter. The pull-down menu 183 corresponding to the item "reading color" has two options corresponding to candidates "color" and "monochrome" of the parameter.

When a user operation of changing the condition "A4" designated in the pull-down menu 181 to "name card" is received through the input I/F 54, for example, the terminal program 65 changes the parameter displayed in the pull-down menu 181 from "A4" to "name card". Then, when a designation on the [scan] icon 184 is received through the input I/F 54 (S34: scan), the terminal program 65 transmits scan instruction information to the MFP 10A, which is the designated apparatus, via the communication I/F 55 (S43). The scan instruction information is information for enabling the designated apparatus to execute the scan operation. The scan instruction information includes the parameters "name card", "fine" and "color" designated in the pull-down menus 181 to 183. The processing of S43 is an example of the input instruction processing.

In the meantime, although not shown, the apparatus program 35 of the MFP 10A receives the scan instruction information from the portable device 50 via the communication I/F 25. Then, the apparatus program 35 enables the scanner 12 to execute the scan operation in accordance with the parameters included in the scan instruction information. The scanner 12 reads an image recorded on a document set on a contact glass or an ADF (abbreviation of Auto Document Feeder) (not shown) and generates scan data indicating the image. Then, the apparatus program 35 transmits the scan data generated by the scanner 12 to the portable device 50 via the communication I/F 25, as a response of the scan instruction information.

Then, the terminal program 65 of the portable device 50 receives the scan data from the MFP 10A via the communication I/F 55, as the input data, and temporarily stores the received input data in the memory 62. Then, the terminal program 65 determines whether the designated program ID is stored in the memory 62 (S44). Although the designated program ID is described in detail later, when the operation icon 122 is tapped, the designated program ID has not been stored in the memory 62.

Figure 12A:
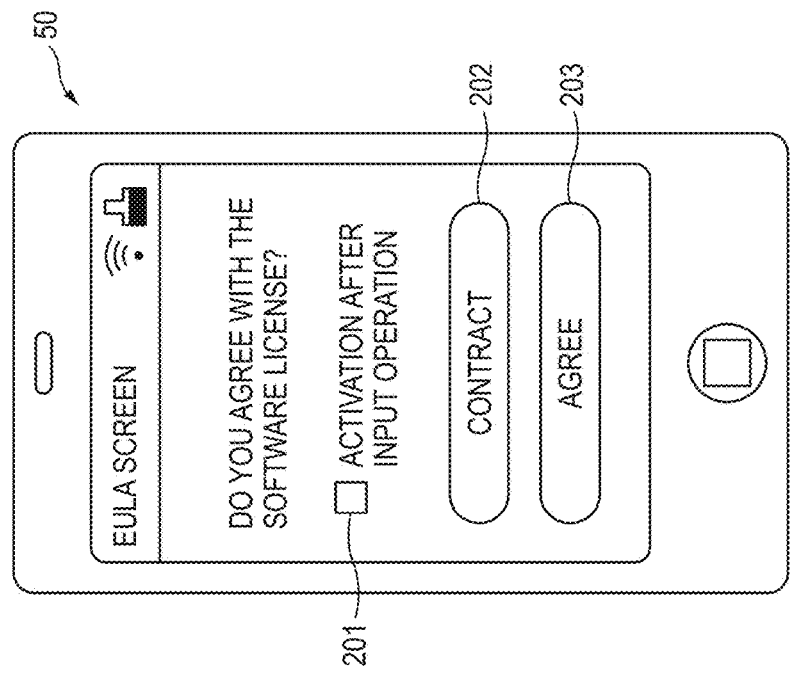

When it is determined that the designated program ID has not been stored in the memory 62 (S44: No), the terminal program 65 displays a scan result screen shown in FIG. 12A on the display 53 (S45). The scan result screen includes an input image 191, plug-in icons 192, 193 and a [save] icon 194. The input image 191 is an image expressed by the input data that has been obtained in S43. The plug-in icons 192, 193 correspond to the external programs "001", "002" in which the function information "input" is set. Then, the terminal program 65 receives a user operation on the scan result screen through the input I/F 54 (S46).

Subsequently, when a designation on the plug-in icon 193 is received through the input I/F 54 (S46: PI), for example, the terminal program 65 activates the external program "002" corresponding to the designated plug-in icon 193 (S47). The processing of S47 is an example of the first post-processing and will be described in detail later. In the meantime, when a designation on the [save] icon 194 is received through the input I/F 54 (S46: save), the terminal program 65 stores the input data in the memory 62 (S48), and ends the scan processing. On the other hand, the terminal program 65 may be configured to enable the user to select one of the plurality of external programs 66 through the input I/F 54, and may be configured to store the input data in the memory 62 with being associated with the program ID of the designated external program 66, as shown in FIG. 3B.

Returning to FIG. 4A, when a designation on the plug-in icons 123, 124, 125 shown in FIG. 8B is received through the input I/F 54 (S13: PI), the terminal program 65 executes PG activation processing shown in FIG. 7 (S16).

[PG Activation Processing]

First, the terminal program 65 temporarily stores the program IDs of the external programs corresponding to the designated plug-in icons 123 to 125 in the memory 62, as the designated program IDs. That is, the designated program ID is a program ID for identifying "designated program", which is the external program corresponding to each of the designated plug-in icons 123 to 125. Also, the terminal program 65 determines the setting value of the function information, which is included in the program record of the designated program, of the program records obtained in S11 (S51). The processing of S51 is an example of the first determination processing.

Figure 5:
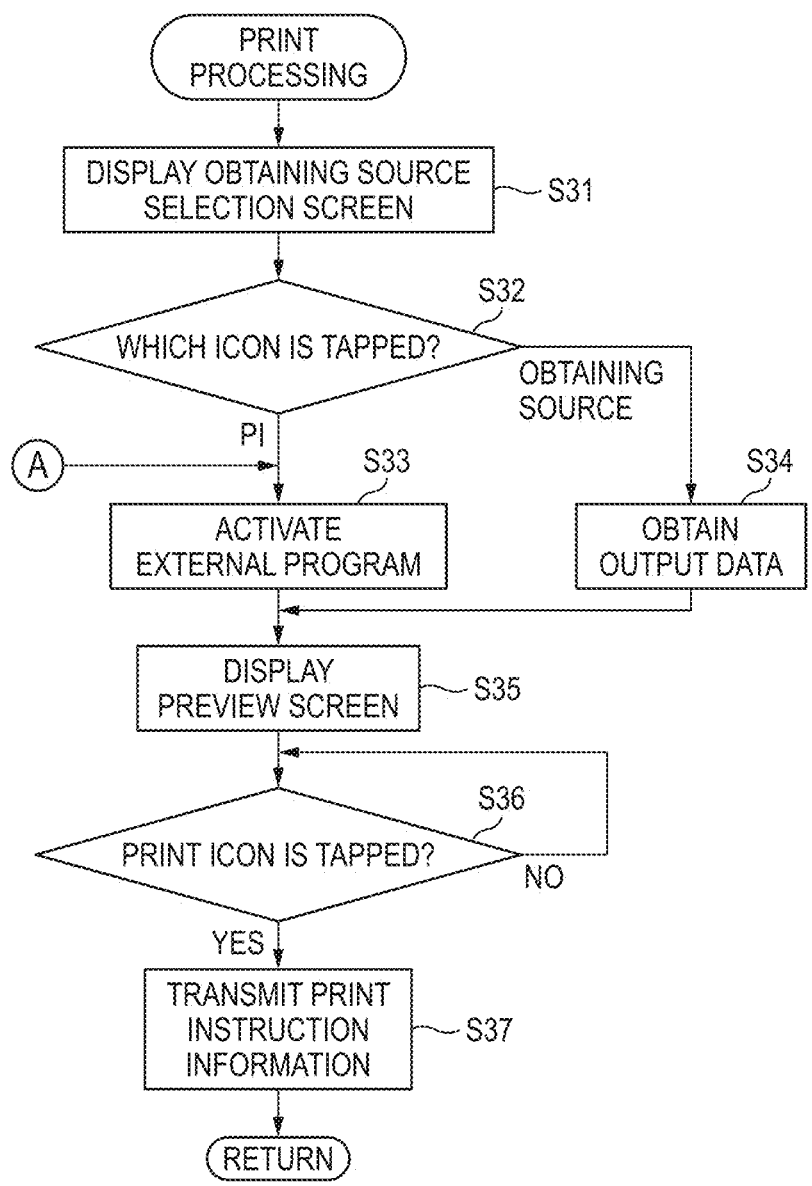
FIG. 5 is a flowchart of print processing.

As an example, when the plug-in icons 123, 125 are designated, the terminal program 65 determines that "output" is set in the function information of the designated program (S51: output), and executes processing of S33 and thereafter in FIG. 5. That is, the terminal program 65 activates the designated program by using the activation API, in S33. Since the processing of S33 and thereafter has been already described, the overlapping descriptions are omitted. As another example, when the plug-in icon 124 is designated, the terminal program 65 determines that only "input" is set in the function information of the designated program (hereinafter, referred to as "the designated program '002'") (S51: only input), and determines the setting value of the initial activation flag of the designated program "002" (S52). The processing of S52 is an example of the third determination processing.

Then, when it is determined that the first value "ON" is set in the initial activation flag of the designated program "002" (S52: ON), the terminal program 65 activates the designated program "002" without executing processing of S55 and thereafter. That is, the terminal program 65 designates the program ID "002", as an argument, and executes the activation API. Also, the OS 64 activates the external program "002" identified with the program ID "002", which is an argument of the activation API, at the foreground. Also, the OS 64 switches the terminal program 65 from the foreground to the background. This processing is an example of the initial activation processing.

Figure 12B:
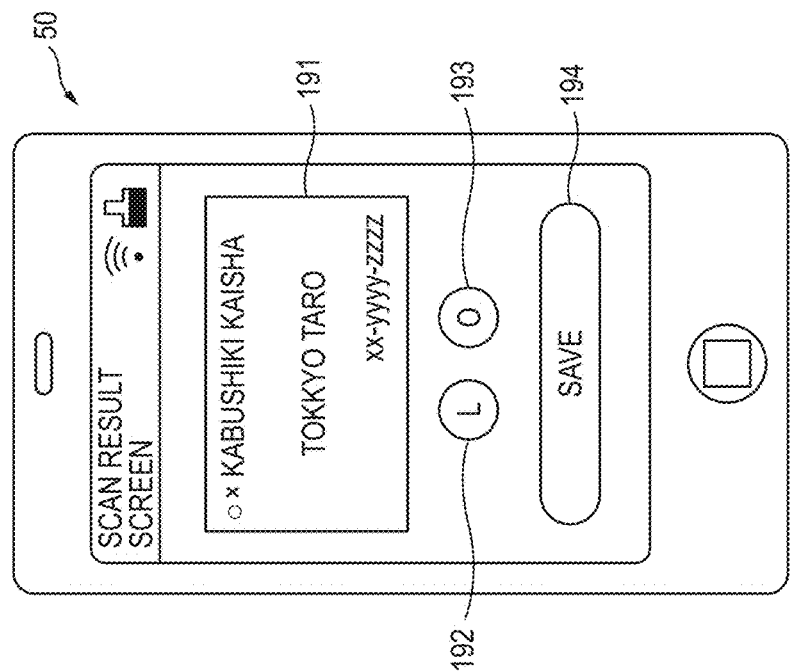

Then, when the designated program "002" is first activated from the terminal program 65 by the activation API, the designated program "002" displays an EULA screen shown in FIG. 12B on the display 53 (S53). The EULA screen is a screen for checking with a user of the portable device 50 as to whether to agree with a using condition of the designated program "002" described in a software license. The EULA screen includes a message "Do you agree with the software license?", a check box 201, a [contract] icon 202 and an [agree] icon 203. Then, the designated program "002" receives a user operation on the EULA screen through the input I/F 54 (S54). This processing is an example of the initial processing.

The check box 201 corresponds to an instruction to switch the setting value of the after-input activation flag. More specifically, the check box 201 at a checked state corresponds to an instruction to set the first value "ON" in the after-input activation flag. Also, the check box 201 at an unchecked state corresponds to an instruction to set the second value "OFF" in the after-input activation flag. The [contract] icon 202 corresponds to an instruction to display a body text of the software license on the display 53. The [agree] icon 203 corresponds to agreement with the using condition.

Then, when a user operation of tapping a position of the check box 201 is received through the input I/F 54, the terminal program 65 switches the state of the check box 201 from one of the checked state and the unchecked state to the other. Also, when a user operation on the [contract] icon 202 is received through the input I/F 54, the terminal program 65 displays the body text of the software license on the display 53, which is not shown.

Also, when a designation on the [agree] icon 203 is received through the input I/F 54 (S54: Yes), the terminal program 65 changes the initial activation flag from the first value "ON" to the second value "OFF" in the program record of the designated program "002", sets the setting value corresponding to the state the check box 201 to the after-input activation flag, and ends the processing. Then, the terminal program 65 is switched from the background to the foreground by the OS 64. The terminal program 65 may display the main screen on the display 53, for example.

Also, when it is determined that the second value "OFF" is set to the initial activation flag of the designated program "002" (S52: OFF), the terminal program 65 determines the setting value of the after-input activation flag of the designated program "002" (S55). The processing of S55 is an example of the fourth determination processing. When it is determined that the second value "OFF" is set to the after-input activation flag of the designated program "002" (S55: OFF), the terminal program 65 activates the designated program "002" by using the activation API, without executing processing of S56 and thereafter (S62).

Also, when it is determined that the first value "ON" is set to the after-input activation flag of the designated program "002" (S55: ON), the terminal program 65 refers to a table shown in FIG. 3B and determines whether image data (hereinafter, referred to as "associated data") associated with the designated program ID "002" is stored in the memory 62 (S56). The processing of S56 is an example of the second determination processing. When it is determined that the associated data is not stored in the memory 62 (S56: No), the terminal program 65 executes processing of S59 and thereafter without executing processing of S57 and S58, which will be described later.

Also, when it is determined that the associated data is stored in the memory 62 (S56: Yes), the terminal program 65 displays a data selection screen shown in FIG. 13A on the display 53 (S57). The data selection screen is an example of the second screen including data icons 211, 212 and a [new] icon 213. Each of the data icons 211, 212 is an example of the second object corresponding to one of the plurality of associated data. The [new] icon 213 corresponds to the execution instruction of S43. Then, the terminal program 65 receives a user operation on the data selection screen through the input I/F 54 (S58). The processing of S57 is an example of the second display processing, and the processing of S58 is an example of the second reception processing.

Subsequently, when a designation on the data icon 211 is received through the input I/F 54 (S58: data), for example, the terminal program 65 activates the designated program "002" by using the image data corresponding to the data icon 211, as the input data, without executing processing of S59 and thereafter (S62). That is, the terminal program 65 designates, as an argument, the program ID "002" and a pointer indicating a head address of a memory region in which the input data is stored, and executes the activation API. Also, the OS 64 activates the external program "002" identified with the program ID "002", which is an argument of the activation API, at the foreground. Also, the OS 64 switches the terminal program 65 from the foreground to the background. This processing is an example of the second post-processing.

Figure 13B:
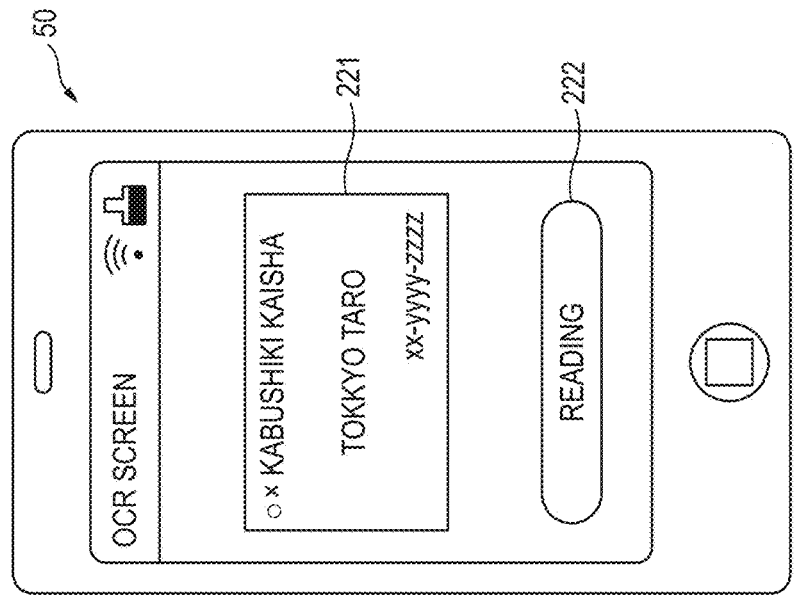
Figure 13A:
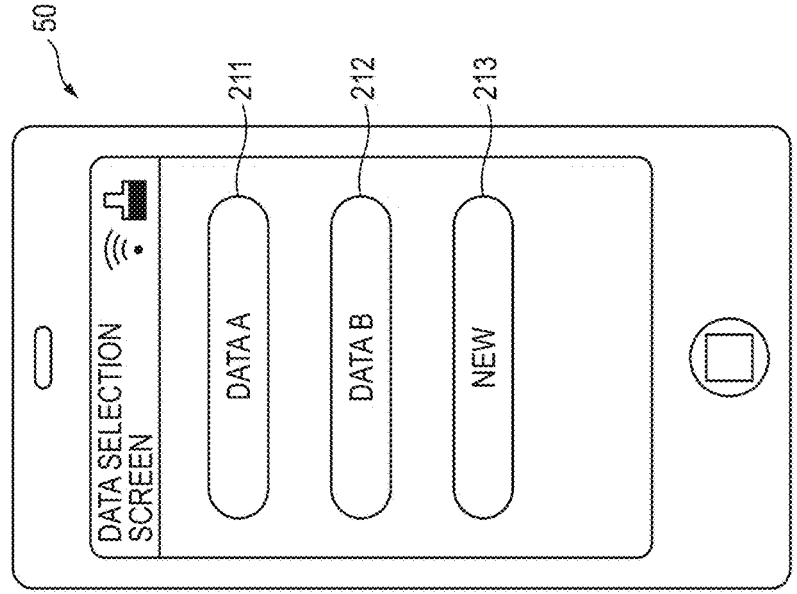

Subsequently, when the external program "002" is activated from the terminal program 65 by the activation API, the external program "002" displays an OCR screen shown in FIG. 13B on the display 53. The OCR screen includes an input image 221 and a [reading] icon 222. The input image 221 is an image expressed by the input data stored in the memory region indicated by the designated pointer. The [reading] icon 222 corresponds to an instruction to extract a character string included in the input image 221. Then, the external program "002" receives a user operation on the OCR screen through the input I/F 54.

When a designation on the [reading] icon 222 is received through the input I/F 54, the external program "002" extracts character strings "Ox Kabushiki Kaisha", "TOKKYO Taro" and "xx-yyyy-zzzz" by the well-known algorithm. Then, the external program "002" registers the extracted character strings in an address book of the memory 62 or the like, and ends the processing. This processing is an example of the processing for the input data. Then, the OS 64 switches the terminal program 65 from the background to the foreground. Then, the terminal program 65 switched to the foreground ends the PG activation processing.

Also, when a designation on the [new] icon 213 is received through the input I/F 54 (S58: new), the terminal program 65 determines whether the portable device 50 is connected to the plurality of image input devices (for example, the scanner 12 and the receptacle (not shown) of the MFP 10 and the camera (not shown) of the portable device 50) (S59). When it is determined that the portable device 50 is connected to only one image input device (S59: No), the terminal program 65 executes the processing of S41 and thereafter, without executing processing of S60 and S61, which will be described later.

Also, when it is determined that the portable device 50 is connected to the plurality of image input devices (S59: Yes), the terminal program 65 displays an input source selection screen shown in FIG. 14A on the display 53 (S60). The input source selection screen is an example of the fourth screen including input source icons 231, 232, 233. The input source icons 231, 232, 233 are examples of the fourth object corresponding to the scanner 12 of the MFP 10, the receptacle (not shown) of the MFP 10 and the camera (not shown) of the portable device 50, respectively. Then, the terminal program 65 receives a user operation on the input source selection screen through the input I/F 54 (S61). The processing of S60 is an example of the fourth display processing, and the processing of S61 is an example of the fourth reception processing.

Subsequently, when a designation on the input source icon 231 is received through the input I/F 54 (S61: Yes), for example, the terminal program 65 displays a scan setting screen shown in FIG. 14B on the display 53 (S41). When a designation on the [scan] icon 184 is received through the input I/F 54 (S42: Yes), the terminal program 65 enables the scanner 12 of the MFP 10 to execute the scan operation (S43). Since the processing of S43 has been already described, the overlapping description is omitted.

Figure 14B:
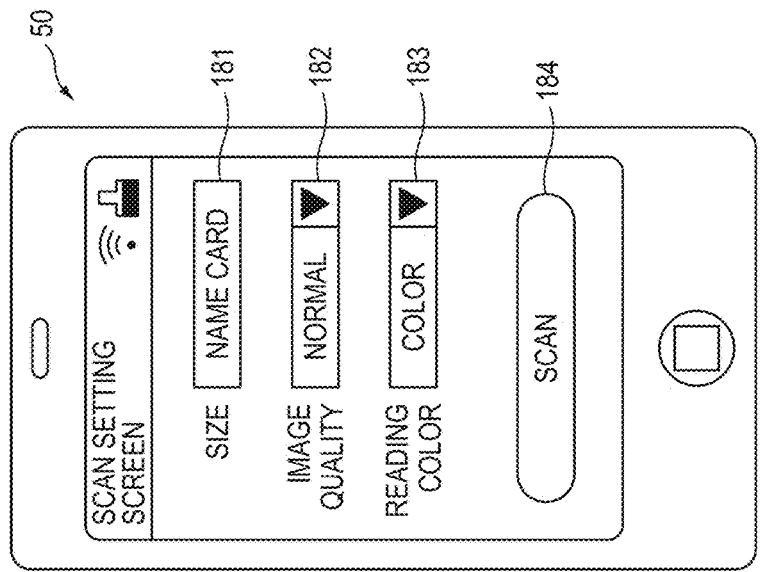

In the meantime, the scan setting screen shown in FIG. 14B is different from that of FIG. 11B, in that the parameter "name card" designated in the pull-down menu 181 cannot be changed. The parameter "name card" of the item "size" is a parameter inherent to the designated program "002" configured to extract a character string from the input data obtained by reading an image recorded on a name card, for example. The inherent parameter is a parameter capable of appropriately expressing the function of the corresponding external program 66, as compared to the other parameters of the item, for example. The parameter inherent to each external program 66 may be included in the program record of FIG. 3A, for example.

Figure 14A:
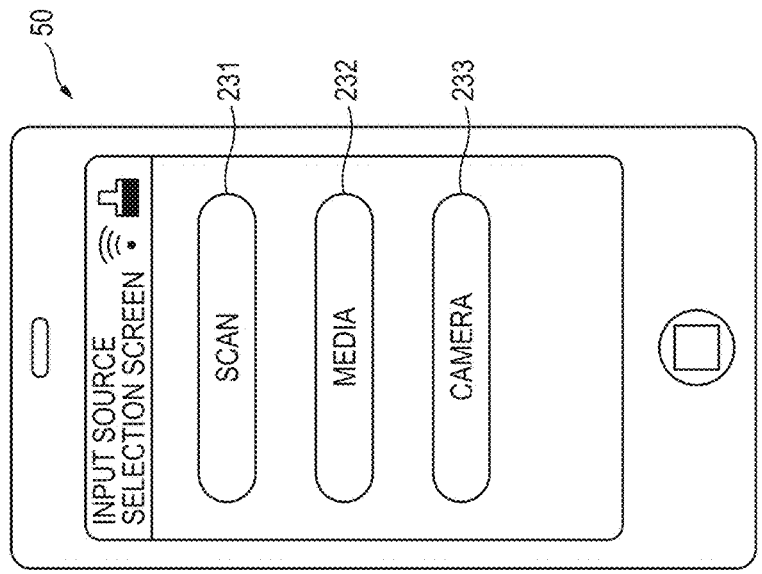

Also, in the processing of S43 that is executed when the input source icon 232 of FIG. 14A is designated, the terminal program 65 transmits reading instruction information to the MFP 10 via the communication I/F 55. The reading instruction information is information of instructing reading of image data recorded in a portable recording medium (not shown) mounted to the receptacle. Then, the terminal program 65 receives the input data from the MFP 10 via the communication I/F 55, and temporarily stores the received input data in the memory 62. Also, in the processing of S43 that is executed when the input source icon 233 of FIG. 14A is designated, the terminal program 65 enables the camera of the portable device 50 to execute a photographing operation, and temporarily stores input data obtained from the camera in the memory 62.

Subsequently, when it is determined that the designated program ID "002" is stored in the memory 62 (S44: Yes), the terminal program 65 activates the designated program "002" without executing the processing of S45 and S46 (S47). That is, the terminal program 65 designates, as an argument, the program ID "002" and a pointer indicating a head address of a memory region in which the input data is temporarily stored in S43, and executes the activation API. Since the processing thereafter is the same as the processing of S62 described with reference to FIG. 13A, the overlapping description is omitted.

[Operational Effects of Illustrative Embodiment]

According to the illustrative embodiment, it is possible to activate the external programs 66 corresponding to the designated plug-in icons 123 to 125 at the appropriate timings in accordance with the function information during the processing of S47 after the input instruction processing and the processing of S33 before the output instruction processing. Thereby, it is possible to smoothly execute a series of processing for the image data. Also, according to the illustrative embodiment, it is possible to activate the designated program at the user's desired timing, based on the setting value of the after-input execution flag.

Also, according to the illustrative embodiment, since the plug-in icons 123, 125 of the function information "output" and the plug-in icon 124 of the function information "input" are displayed on the main screen in a different manner, it is possible to enable the user to recognize the functions of the external programs corresponding to the plug-in icons 123 to 125. In the meantime, the plug-in icon 123 corresponding to the external program "001" in which both "input" and "output" are set in the function information may be included in an input group or an output group.

Also, the external program 66 is configured to execute the initial processing of requesting the user to agree with the license at the initially activated timing, for example. Therefore, like the illustrative embodiment, it is possible to enable the external program 66 to appropriately execute the initial processing by determining whether the external program 66 is activated for the first time. However, the specific example of the initial processing is not limited to the agreement with the license, and may be an input of the setting information or the like.

Also, according to the illustrative embodiment, when the input data has been already stored in the memory 62, the designated program is enabled to execute the processing for the input data stored in the memory 62, instead of the input data that is to be input from the image input device in S43. Thereby, it is possible to designate the input data, which is to be processed by the designated program, by a variety of methods. Also, when the plurality of image data is stored in the memory 62, the user can select the input data, which is to be processed by the designated program, through the data selection screen. Thereby, it is possible to smoothly execute a series of processing for the image data.

Also, according to the illustrative embodiment, the user can select one of the plurality of image input devices connected to the portable device 50 through the input source selection screen. Thereby, it is possible to obtain the input data, which is to be processed by the designated program, by a variety of methods. Also, according to the illustrative embodiment, in the scan setting screen of FIG. 14B, some of the plurality of items "size", "image quality" and "reading color" configuring the execution condition is fixed to the parameter inherent to the designated program, so that it is possible to input the input data suitable for the designated program to the image input device.

Incidentally, in the above-explained illustrative embodiment, when the plug-in icon 123 corresponding to the external program "001" in which both "input" and "output" are set in the function information is tapped, the processing of S33 and thereafter is executed (S51: output). However, the determination of S51 is not limited to the above-described example. For example, the processing of S52 and thereafter may be executed or the user may designate which of S33 and S52 the processing proceeds to, through the input I/F 54.

It has been explained that, in the MFP 10 and the portable device 50 of the illustrative embodiment, the various programs stored in the memories 32, 62 are executed by the CPUs 31, 61, so that the respective processing to be executed by the controller of the disclosure is implemented. However, the configuration of the controller is not limited thereto, and some or all of the controller may be implemented by the hardware such as an integrated circuit and the like.

The disclosure can be implemented as not only the MFP 10 and the portable device 50 but also a program configured to enable the MFP 10 and the portable device 50 to execute the processing. The program may be provided with being recorded in a non-transitory recording medium. The non-transitory recording medium may include a memory mounted on a server that can be connected to the MFP 10 and the portable device 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable storage medium having a computer program stored thereon and readable by a computer of an image processing apparatus, the image processing apparatus comprising a memory and a communication interface being communicable with an image input apparatus and an image output apparatus, the image input apparatus being configured to execute an input operation of transmitting input data to the image processing apparatus, the image output apparatus being configured to execute an output operation of transmitting output data designated by the computer program, the memory storing a plurality of external programs that can be activated by the computer program, the computer program, when executed by the computer, causes the image processing apparatus to perform:

specifying a designated program, which is one of the external programs;

obtaining function information of the designated program;

determining whether the designated program has one of a first function and a second function, based on the function information of the designated program, the first function being a function of executing processing for the input data, the second function being a function of enabling a user to designate the output data;

in a case where it is determined that the designated program has the first function,
instructing the image input apparatus to execute the input operation; and
performing first post-processing of designating the input data input in the input operation and activating the designated program; and in a case where it is determined that the designated program has the second function,
performing pre-processing of activating the designated program to obtain the output data; and
controlling the image output apparatus to execute the output operation for the output data obtained in the pre-processing.

2. The non-transitory computer-readable storage medium according to claim 1,
wherein the image processing apparatus further comprises a display and an input interface,
wherein in the specifying of the designated program, the computer program, when executed by the computer, causes the image processing apparatus to perform:
displaying a first screen on the display, the first screen comprising a plurality of first objects each of which corresponds to each of the plurality of external programs; and
receiving a user operation to designate one of the plurality of first objects on the first screen through the input interface.

3. The non-transitory computer-readable storage medium according to claim 2, wherein the computer program, when executed by the computer, causes the image processing apparatus to perform:
obtaining the function information of each of the external programs before performing the displaying of the first screen; and
in the displaying of the first screen, displaying the first object corresponding to the external program having the first function and the first object corresponding to the external program having the second function in a different manner.

4. The non-transitory computer-readable medium according to claim 1, wherein in the execution of the input operation, the computer program, when executed by the computer, causes the image input apparatus to perform transmitting the input data to the image processing apparatus, the input data being input in accordance with an instruction of the computer program.

5. The non-transitory computer-readable storage medium according to claim 1, wherein the computer program, when executed by the computer, causes the image processing apparatus to perform:
    in the case where it is determined that the designated program has the first function, determining whether the input data is stored in the memory;
    in a case where it is determined that the input data is stored in the memory, performing second post-processing of designating the input data stored in the memory and activating the designated program without performing the instructing; and
    in a case where it is determined that the input data is not stored in the memory, performing the instructing.

6. The non-transitory computer-readable storage medium according to claim 5,
    wherein the memory stores the input data with being associated with program identification information for identifying one of the external programs, and
    wherein in the determining of whether the input data is stored in the memory, the computer program, when executed by the computer, causes the image processing apparatus to determine whether the input data associated with the program identification information of the designated program is stored in the memory.

7. The non-transitory computer-readable storage medium according to claim 5,
    wherein the image processing apparatus further comprises a display and an input interface, and
    wherein in the case where it is determined that a plurality of the input data is stored in the memory, the computer program, when executed by the computer, causes the image processing apparatus to perform:
    displaying a second screen on the display, the second screen comprising a plurality of second objects each of which corresponds to each of the plurality of the input data stored in the memory,
    receiving a user operation on the second screen through the input interface; and
    performing the second post-processing of designating the input data corresponding to the second object designated in the receiving of the user operation on the second screen and activating the designated program.

8. The non-transitory computer-readable storage medium according to claim 1,
    wherein the image processing apparatus further comprises a display and an input interface,
    wherein the image input apparatus is configured to execute the input operation in accordance with an execution condition, the execution condition being specified by a combination of a plurality of parameters each of which corresponds to each of a plurality of items, and
    wherein the computer program, when executed by the computer, causes the image processing apparatus to perform:
        displaying a third screen on the display, the third screen comprising a plurality of third objects, the third object corresponding to one of the plurality of items and indicating a state where one of a plurality of candidates for the parameter, which can be designated for the item, is designated;
        receiving a user operation of changing the parameter designated with the third object on the third screen through the input interface; and
        instructing the image input apparatus to execute the input operation in accordance with the plurality of the parameters each of which is designated by each of the third objects, and
    wherein in the displaying of the third screen that is performed when it is determined that the designated program has the first function, the computer program, when executed by the computer, causes the image processing apparatus to display at least one of the third objects in such a manner that the parameter inherent to the designated program is designated and the parameter cannot be changed in the receiving of the user operation on the third screen.

9. The non-transitory computer-readable storage medium according to claim 1, wherein the computer program, when executed by the computer, causes the image processing apparatus to perform:
    in the case where it is determined that the designated program has the first function, determining whether the designated program is first activated;
    in a case where it is determined that the designated program is not first activated, performing the instructing and the first post-processing; and
    in a case where it is determined that the designated program is first activated, performing initial activation processing of activating the designated program to execute initial processing, without performing the instructing and the first post-processing.

10. The non-transitory computer-readable storage medium according to claim 1, wherein the computer program, when executed by the computer, causes the image processing apparatus to perform:
    in the obtaining of the function information, further obtaining timing information indicating an activation timing of the external program having the first function, the timing information having one of a first value and a second value designated through the communication interface by a user, the first value indicating that the external program is to be activated after performing the instructing, the second value indicating that the external program is to be activated without performing the instructing;
    in the case where it is determined that the designated program has the first function, determining a value of the timing information;
    wherein in a case where it is determined that the value of the timing information is the first value, performing the first post-processing after performing the instructing, and
    wherein in a case where it is determined that the value of the timing information is the second value, activating the designated program without performing the instructing.

11. The non-transitory computer-readable storage medium according to claim 1,
    wherein the image processing apparatus further comprises a display and an input interface,
    wherein the communication interface is communicable with a plurality of the image input apparatuses, and
    wherein the computer program, when executed by the computer, causes the image processing apparatus to perform:
        in the case where it is determined that the designated program has the first function, before performing the instructing, displaying a forth screen on the display, the fourth screen comprising a plurality of fourth objects each of which corresponds to each of the image input apparatuses; and receiving a user operation on the fourth screen through the input interface; and in the instructing, instructing the image input apparatus corresponding to the fourth object designated in the receiving the user operation on the fourth screen to perform the input operation.

12. An image processing apparatus comprising:

a processor;

a memory that stores a main program and a plurality of external programs that can be activated by the main program; and a communication interface communicable with an image input apparatus and an image output apparatus, the image input apparatus being configured to execute an input operation of transmitting input data to the image processing apparatus, the image output apparatus being configured to execute an output operation of transmitting output data to be designated by the main program, the main program, when executed by the processor, causes the image processing apparatus to perform:

specifying a designated program, which is one of the external programs;

obtaining function information of the designated programs;

determining whether the designated program has one of a first function and a second function, based on the function information of the designated program, the first function being a function of executing processing for the input data, the second function being a function of enabling a user to designate the output data;

in a case where it is determined in the first determination processing that the designated program has the first function, instructing the image input apparatus to execute the input operation; and performing first post-processing of designating the input data input in the input operation and activating the designated program; and in a case where it is determined that the designated program has the second function, performing pre-processing of activating the designated program to obtain the output data; and controlling the image output apparatus to execute the output operation for the output data obtained in the pre-processing.

13. The image processing apparatus according to claim 12, further comprising:

a display; and an input interface, wherein in the specifying of the designated program, the main program, when executed by the processor, causes the image processing apparatus to perform:

displaying a first screen on the display, the first screen comprising a plurality of first objects each of which corresponds to each of the plurality of external programs; and receiving a user operation to designate one of the plurality of first objects on the first screen through the communication interface.

14. The image processing apparatus according to claim 13, wherein the main program, when executed by the processor, causes the image processing apparatus to perform:

obtaining the function information of each of the external programs before performing the displaying of the first screen; and in the displaying of the first screen, displaying the first object corresponding to the external program having the first function and the first object corresponding to the external program having the second function in a different manner.

15. The image processing apparatus according to claim 12, wherein the image input apparatus is a scanner communicable with the communication interface via a communication network, an external memory communicable with the communication interface via the communication network or a camera communicable with an interval bus of the image processing apparatus.

16. The image processing apparatus according to claim 12, wherein the main program, when executed by the processor, causes the image processing apparatus to perform:

in the case where it is determined that the designated program has the first function, determining whether the input data is stored in the memory;

in a case where it is determined that the input data is stored in the memory, performing second post-processing of designating the input data stored in the memory and activating the designated program without performing the instructing; and in a case where it is determined that the input data is not stored in the memory, performing the instructing.

17. The image processing apparatus according to claim 12, further comprising:

a display; and an input interface, wherein the image input apparatus is configured to execute the input operation in accordance with an execution condition, the execution condition being specified by a combination of a plurality of parameters each of which corresponds to each of a plurality of items, wherein the main program, when executed by the processor, causes the image processing apparatus to perform:

displaying a third screen on the display, the third screen comprising a plurality of third objects, the third object corresponding to one of the plurality of items and indicating a state where one of a plurality of candidates for the parameter, which can be designated for the item, is designated;

receiving a user operation of changing the parameter designated with the third object on the third screen through the communication interface; and instructing the image input apparatus to execute the input operation in accordance with the plurality of the parameters each of which is designated by each of the third objects, and wherein in the displaying of the third screen that is performed when it is determined that the designated program has the first function, the main program, when executed by the processor, causes the image processing apparatus to display at least one of the third objects in such a manner that the parameter inherent to the designated program is designated and the parameter cannot be changed in the receiving of the user operation on the third screen.

18. The image processing apparatus according to claim 12, wherein the main program, when executed by the processor, causes the image processing apparatus to perform:
  in the case where it is determined that the designated program has the first function, determining whether the designated program is first activated;
  in a case where it is determined that the designated program is not first activated, performing the instructing and the first post-processing; and
  in a case where it is determined that the designated program is first activated, performing initial activation processing of activating the designated program to execute initial processing, without performing the instructing and the first post-processing.

19. The image processing apparatus according to claim 12, wherein the main program, when executed by the processor, causes the image processing apparatus to perform:
  in the obtaining of the function information, further obtaining timing information indicating an activation timing of the external program having the first function, the timing information having one of a first value and a second value designated through the communication interface by a user, the first value indicating that the external program is to be activated after performing the instructing, the second value indicating that the external program is to be activated without performing the instructing;
  in the case where it is determined that the designated program has the first function, determining a value of the timing information;
  wherein in a case where it is determined that the value of the timing information is the first value, performing the first post-processing after performing the instructing, and
  wherein in a case where it is determined that the value of the timing information is the second value, activating the designated program without performing the instructing.

20. The image processing apparatus according to claim 12, further comprising:
  a display; and
  an input interface,
  wherein the communication interface is communicable with a plurality of the image input apparatuses, and
  wherein the main program, when executed by the processor, causes the image processing apparatus to perform:
    in the case where it is determined that the designated program has the first function, before performing the instructing,
      displaying a fourth screen on the display, the fourth screen comprising a plurality of fourth objects each of which corresponds to each of the image input apparatuses; and
      receiving a user operation on the fourth screen through the communication interface; and
    in the instructing, instructing the image input apparatus corresponding to the fourth object designated in the receiving the user operation on the fourth screen to perform the input operation.

* * * * *